United States Patent Office 3,526,123
Patented Sept. 1, 1970

3,526,123
HEAT FLOW SENSING DEVICE
Richard E. Putman, Penn Hills, and Lee E. Brecher, Pittsburgh, Pa., assignors to Westinghouse Electric Corporation, Pittsburgh, Pa., a corporation of Pennsylvania
Filed Apr. 11, 1967, Ser. No. 630,006
Int. Cl. G01n 25/00
U.S. Cl. 73—15                        4 Claims

ABSTRACT OF THE DISCLOSURE

An elongated heat flow sensing probe is adapted for insertion into the wall of an apparatus such as furnace. The probe has two concentric portions. For a wall having a known thermal conductivity, the cross sectional areas and thermal conductivities of the portions are chosen such that the probe has the equivalent heat transfer characteristic as the wall. Thermocouples at predetermined locations in the probe measure the wall temperature.

CROSS REFERENCE TO RELATED APPLICATIONS

A related copending patent application has been filed by R. E. Putman et al. to disclose one suitable apparatus and method, utilizing the present heat flow sensing device, for the heat balance control of a rotary kiln. This related copending patent application, now issued as U.S. Pat. No. 3,437,325, is entitled "Heat Balance Control of a Rotary Kiln"; it was filed Apr. 11, 1967, Ser. No. 630,001, and is assigned to the same assignee as is the present application.

BACKGROUND OF THE INVENTION

The present invention relates to the measurement of heat flow at one or more locations in the refractory lining or wall of a furnace or kiln. And more particularly relates to a device for providing temperature signals for the measurement of this heat flow or loss through a furnace wall such that a cooperative control equipment can thereby determine at each device location and from this the total heat flux or loss from the entire furnace or kiln surface.

In many thermal processes an accurate knowledge of the exothermic or endothermic heat of reaction is an important and possibly the primary criterion for the control of the process. While many of the terms in the involved heat balance equation are capable of simple calculation on line, empirical methods have in the past been used to estimate the heat loss through the walls of a furnace refractory lining. This heat loss however is normally one of the largest terms in the involved heat balance equation and is much affected by changes in local ambient conditions such as wind velocity, precipitation and similar factors. Empirical methods of estimating this heat loss term do not therefore allow a significant value to be attached to a net heat of reaction figure. For this reason, an adequate and intelligent control of a process in reference to heat of reaction has in the past generally not been practicable.

SUMMARY OF THE INVENTION

The present invention relates to apparatus operative to sense the heat flux or flow loss through the wall of a furnace or kiln, wherein a temperature difference is measured between two predetermined planes within the heat conducting furnace wall and preferably other than the inner and outermost surfaces of that wall. The device is constructed to have substantially the same heat transfer characteristic as does the furnace wall, and a first temperature sensing device is spaced a predetermined distance from a second temperature sensing device to give a measurement of the temperature differential between said first and second temperature sensing devices.

It is an object of the present invention to provide an improved heat flux measurement device including spaced temperature sensing devices to give temperature differential information relative to two spaced planes of a furnace wall in a manner to minimize any disturbance of the heat flux pattern of the furnace.

The present disclosure describes a heat flow measurement device which is adapted to measure the heat flux through several spaced points in a refractory lining of a furnace, from which the total heat flux from the whole furnace wall surface may be computed. In measuring the actual heat flux, two principles should be observed: (1) the device used should not disturb the basic heat flux pattern of the furnace, (2) the temperature difference should be measured at two planes within the heat conducting layer rather than at the surfaces of the heat conducting layer. This is especially important where the heat entering and leaving the furnace wall is by conduction and/or radiation and with surface temperatures varying according to the heat transfer mode or modes for the same total flux.

DESCRIPTION OF THE PRESENT INVENTION

Figure 1:
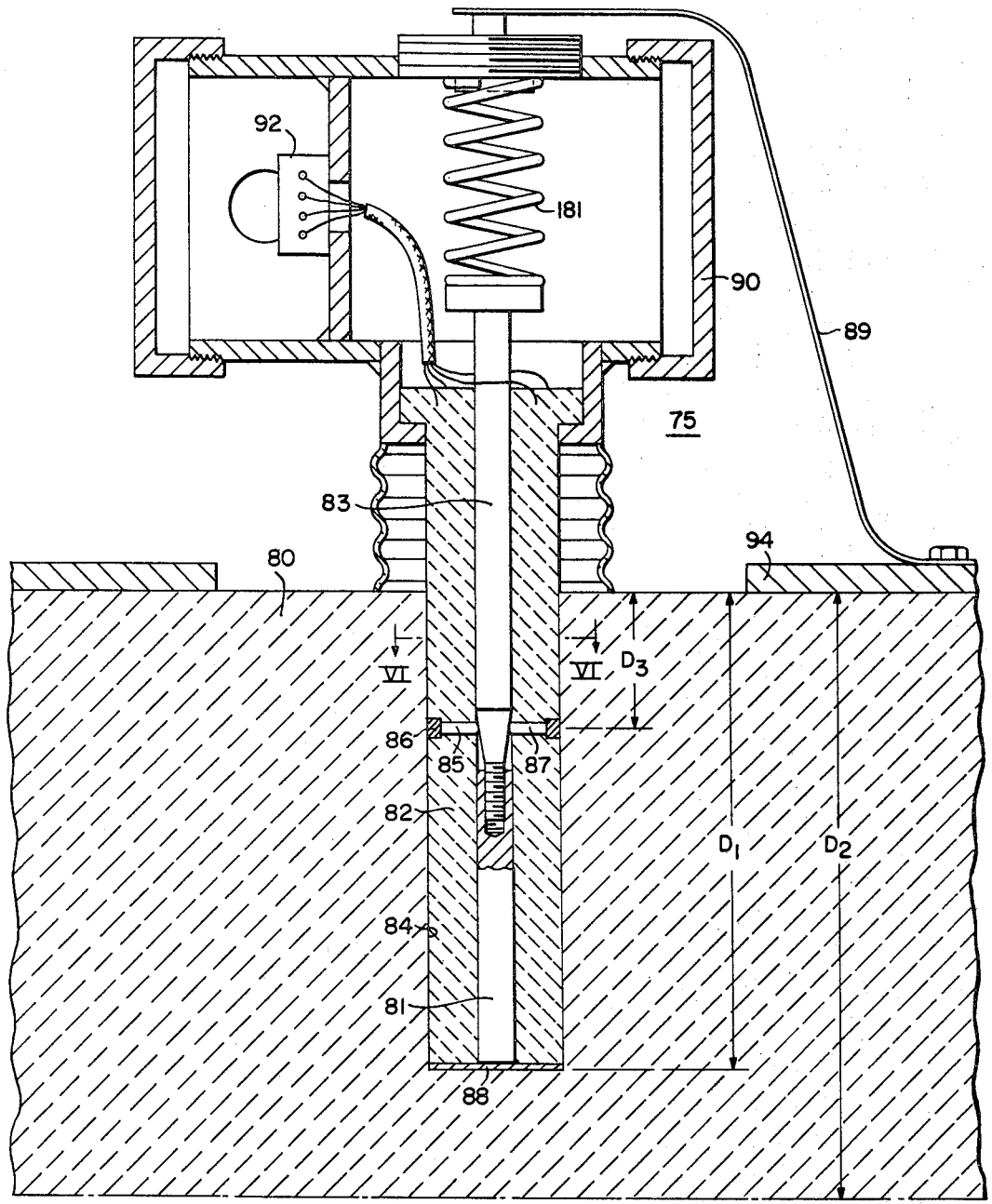
FIG. 1 is a schematic showing of the heat flow measurement device of the present invention.

In FIG. 1, there is shown a differential thermocouple heat flow measuring device 75 mounted within the wall 80 of a kiln and including a first member 82 made of refractory material and inserted into a corresponding opening 84 in the kiln wall 80. A first temperature sensing element 86 in the form of an expandable split ring thermocouple and a second temperature sensing element 88 in the form of a junction thermocouple fastened to a steel plate are positioned to sense the respective associated temperatures within the wall 80. The member 82 is made of a refractory or ceramic material having a predetermined heat transfer coefficient characteristic in relation to that of the wall 80. A resilient spring 181 is provided to apply an inward force to a tapered member 83 that moves between slidable arms 85 and 87 to spread outward and thereby increase the diameter of the split ring thermocouple 86 for the purpose of assuring a better temperature sensing by this thermocouple by pressing against the inner surface of the refractory wall 80 at a location adjacent to this thermocouple 86. A second spring 89 applies an inward force to the whole heat flow measuring device 75 to assure that the device remains in its illustrated position within the wall opening 84, with the thermocouple 88 in good temperature sensing contact with the bottom of the opening 84 in the refractory wall material adjacent to the position of the thermocouple 88.

In this manner, with the distance $D_3$ being known and in the order of 1 inch, the distance $D_2$ being known and in the order of 4½ inches and the distance $D_1$ being known and in the order of 3½ inches, there is provided a means to measure and determine the heat flow in B.t.u.'s per hour per square foot per inch, per degree of temperature difference through the wall 80 of the rotary kiln at the location of the device 75.

Thusly it is seen that the ceramic member 82 is provided with two heat planes. A first such plane is adjacent the thermocouple 88 located at the lower end of the cylindrical member 82 and having one Chromal and one Alumel wire being welded to a stanless steel plate to provide an EMF which reflects the surface temperature of the thermocouple plate 88; to this plate is attached a shaft member 81 which is made of stainless steel and is tapped at its top and keyed to member 82 to prevent rotation of the shaft 81 and thermocouple plate 88 relative to the member 82.

About 2½ inches from the bottom of the member 82, a split ring thermocouple 86 is located in an annular groove in the member 82 which ring defines the second heat plane. A second pair of Chromal and Alumel wires is welded to this ring 86 to provide an EMF which reflects the surface temperature of the ring 86.

Above the thermocouple ring 86 and within the member 82 there is inserted a shaft 83 which at its lower end is provided with a tapered section as shown such that the pins 85 and 87 are pressed outward as the shaft 83 is moved down to thereby increase the diameter of the split ring 86 and press the latter against the side of the hole opening 84 into which the member 82 is inserted. The shaft 83 can be screwed into position or, as an alternate embodiment, the spring 181 can be provided to force the shaft 83 to press downward against the pins 85 and 87.

The housing 90 is provided to protect the heat flow measurement device 75 and to support a thermocouple signal terminal strip 92 to which external circuit connections can be made for receiving temperature signals from the heat flow measurement device 75. Spring 89 can be arranged to press the device 75 down into the opening 84 to assure a good contact between the thermocouple 88 and the refractory material of the kiln wall 80. It also helps prevent the device 75 from dropping out of the opening 84 should the expanded ring per 86 not provide adequate friction for this purpose. The arrangement shown allows the device 75 to perform its function even if the refractory wall 80 should shift in position relative to the external steel cladding 94. In this regard, a one-inch in diameter hole or opening 84 with a flat bottom is first drilled into the refractory wall 80 to a depth in the order of 2½ inches. The steel cladding 94 is then cut away to provide a three inch diameter clearance hole to allow for some relative movement between the steel cladding 94 of the kiln and the refractory wall 80. This will avoid the device 75 being sheared off should such movement occur. The probe member 82 is then inserted into the hole opening 84 with the housing 90 initially removed; the shaft 83 is then either screwed down or pressed into position by the spring 181 until the split ring thermocouple 86 is forced firmly against the sides of the hole 84. Housing 90 may now be replaced as shown in FIG. 1 and the spring 89 assembled into position. The external circuit temperature signal leads are connected to the terminal strip 92 to sense the temperature signals from the respective thermocouples 86 and 88.

Figure 2:
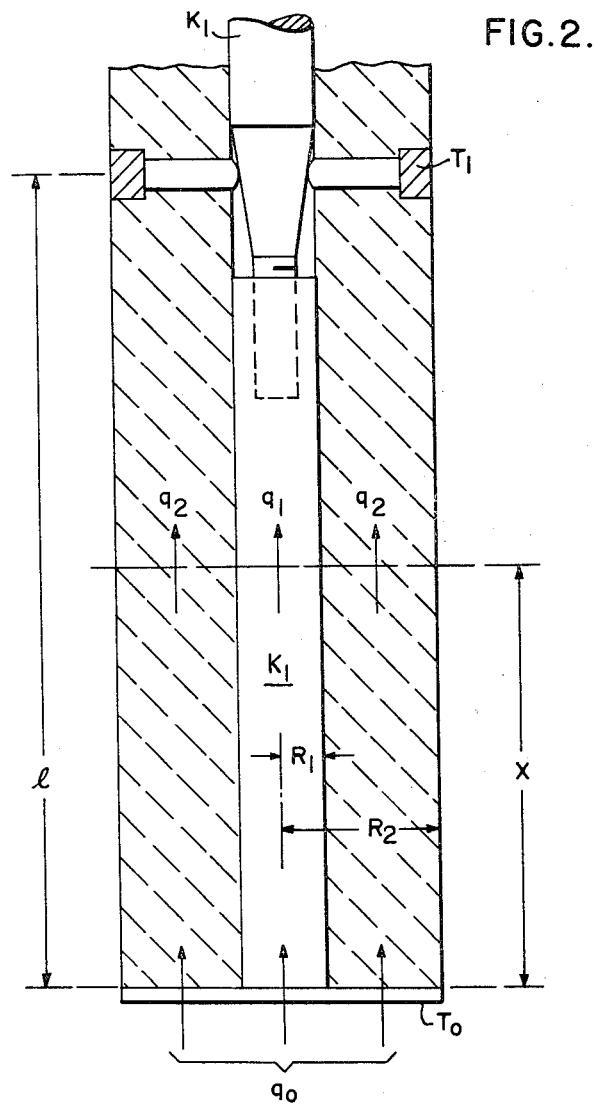
FIG. 2 is an illustrative sketch to show the theory of operation of and the heat flow through the present measurement device.

A mathematical analysis of the device 75 can be made as follows in reference to FIG. 2.

Assuming that, at any section X, the average temperature equals $$T_x = T_0 - \frac{q_0(x)}{K_3} \quad (1)$$

where $T_0$ is the temperature at the thermocouple 88, $q_0$ is the heat flow through the refractory wall, X is the height of the involved average section, and $K_3$ is the heat flow characteristic of the refractory wall.

With the desired temperature profile, the heat flow out of section X through shaft 81 equals:

$$q_1 = \frac{K_1(T_0 - T_x)}{x} = q_0 \frac{K_1}{K_3} \quad (2)$$

where $q_1$ is heat flow of shaft 81 and $K_1$ is heat flow characteristic of shaft 81 and the heat flow out of sevtion X through ceramic member 82 is $$q_2 = \frac{K_2(T_0 - T_x)}{x} = q_0 \frac{K_2}{K_3} \quad (3)$$

where $K_2$ is heat flow characteristic of ceramic member 82.

In order to maintain the temperature profile desired above, the device 75 should pass the same heat energy as an equivalent plug member of refractory wall. Therefore:

$$(R_2^2 - R_1^2) q_0 \frac{K_2}{K_3} + R_1^2 q_0 \frac{K_1}{K_3} = R_2^2 q_0 \quad (4)$$

$$\left[1 - \left(\frac{R_1}{R_2}\right)^2\right] \frac{K_2}{K_3} + \left(\frac{R_1}{R_2}\right)^2 \frac{K_1}{K_3} = 1 \quad (5)$$

Let $$\left(\frac{R_1}{R_2}\right)^2 = \gamma \quad (6)$$

Then $$(1 - \gamma)\frac{K_2}{K_3} + \gamma \frac{K_1}{K_3} = 1 \quad (7)$$

$$\frac{K_2}{K_3} - \gamma \frac{K_2}{K_3} + \gamma \frac{K_1}{K_3} = 1 \quad (8)$$

$$\left(1 - \frac{K_2}{K_3}\right) = \gamma \left(\frac{K_1}{K_3} - \frac{K_2}{K_3}\right) \quad (9)$$

$$(K_3 - K_2) = \left(\frac{R_1}{R_2}\right)^2 (K_1 - K_2) \quad (10)$$

$$\left(\frac{R_1}{R_2}\right)^2 = \left(\frac{K_3 - K_2}{K_1 - K_2}\right) \quad (11)$$

If $K_1 = 5K_3$ and $K_2 = 0.5K_3$, $$\left(\frac{R_1}{R_2}\right)^2 = \left(\frac{K_3 - 0.5K_3}{5K_3 - 0.5K_3}\right) = \frac{0.5}{4.5} = \frac{1}{9} \quad (12)$$

$$R_2 = 3R_1 \quad (13)$$

Thus the desired ratio of the radii, if the effective thermal conductivity of the device is to be equal to $K_3$, can be calculated from a knowledge of the known specific heats of the refractory wall, the member 82 and the shaft 81, respectively.

$$\text{Heat flux through refractory} = q = \frac{K_3(T_0 - T_1)}{l_1} \quad (14)$$

where $T_1$ is temperature at thermocouple 86 and $l_1$, is distance thereto and $q$ is the point flux within the refractory. With the above radius ratio, the device 75 will pass the same total heat energy across its cross sectional area A as does the ceramic or refractory wall 80 i.e., $$(\bar{q} \text{ device}) A = (\bar{q} \text{ ceramic}) A$$

and the average fluxes are the same.

It should be here noted in general that $q$ is heat flow in B.t.u./(sq. ft.) (hour) and K is heat flow characteristic in B.t.u./(sq. ft) (hour) (° F.) (inch).

Figure 3:
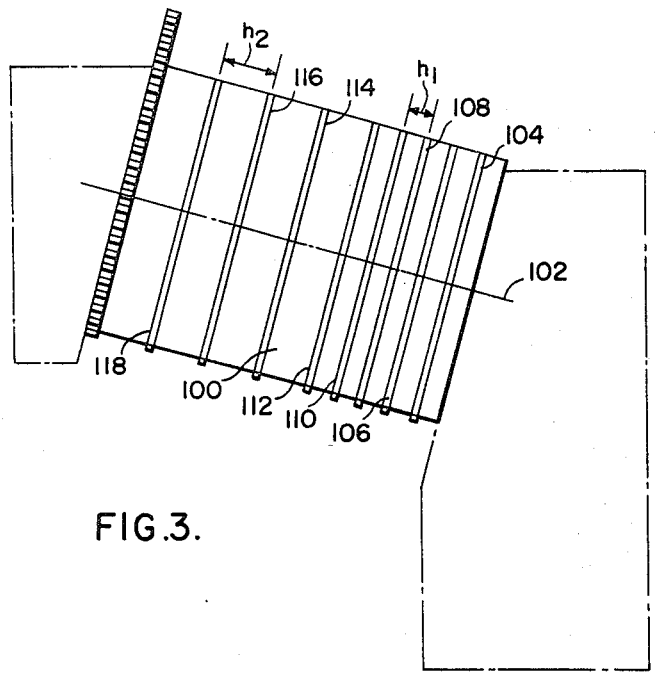
FIG. 3 is a diagrammatic showing of a rotary kiln to illustrate one application of the present device.

In FIG. 3, there is shown a rotary kiln 100 which is rotatable about an axis 102 and includes three peripherally spaced heat flow measurement devices respectively to sense the heat loss at the longitudinal locations 104, 106, 108, 110, 112, 114, 116 and 118.

Figure 4:
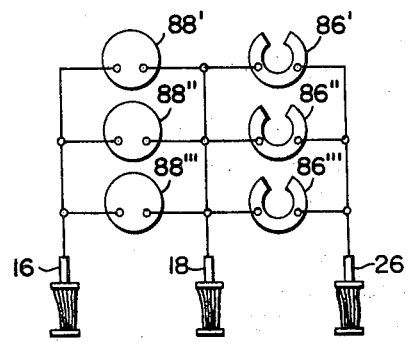
FIG. 4 is a diagrammatic showing of one circuit arrangement for sensing the temperature signals provided by the present device.

In FIG. 4, there is shown how the provided three differential thermocouple devices at each of the above locations are arranged in circuit configuration. The innermost thermocouples 88', 88" and 88'" for the three radially spaced devices positioned around the kiln at a given location lengthwise of the kiln are connected in parallel and between two slip ring connections 16 and 18. The outermost split ring thermocouples 86', 86" and 86'" are similarly parallel connected between connections 18 and 26.

Figure 5:
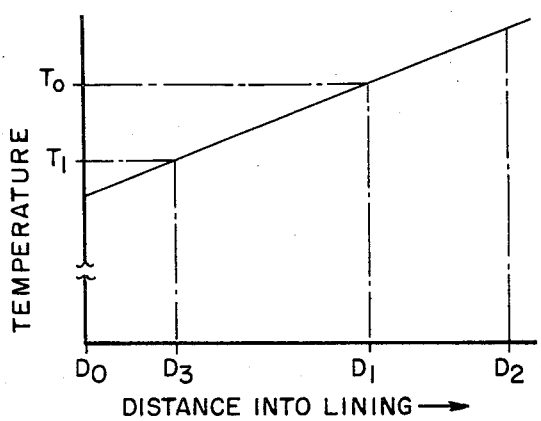
FIG. 5 is a curve to illustrate the typical temperature distribution arrangement within the kiln wall.

In FIG. 5, there is shown the temperature relationship as a function of wall distance within the furnace or kiln wall 80 as shown in FIG. 1, with the temperature at the exterior of the kiln being shown for distance $D_0$, the relative temperature $T_1$ at distance $D_3$, the relative temperature $T_0$ at the distance $D_1$ and the projected relative temperature at the distance $D_2$ being indicated.

Typical temperatures to be sensed in the burning zone of the kiln shown in FIG. 3 could be in the order of 2300° F. at the innermost surface and distance $D_2$, and in the order 100° F. at the outermost surface and distance $D_2$, in the order of 1700° F. at the thermocouple 88 and distance $D_1$ and in the order of 500° F. at the thermocouple 86 and distance $D_3$. For the drying and calcining zones, typical temperatures to be sensed at distance $D_2$ could be in order of 1400° F., at distance $D_2$ in order of 100° F., at a distance $D_1$ in order of 1000° F. and at distance $D_3$ in order of 300° F.

Also, from Equations 11 and 12 it is here contemplated that the heat flow characteristics $K_1$ and $K_2$ and $K_3$ should have the following relationship:

$$K_1 > K_3 > K_2$$

such that by proper design selection of the respective cross sectional areas of the shaft 81 and the member 82, the device 75 will be effective to match the heat flow of the refractory wall 80.

Figure 6:
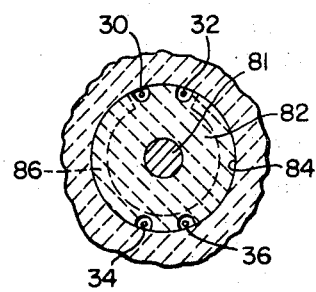
FIG. 6 is a cross-sectional view of a portion of the present heat flow measurement device to illustrate how the temperature signal conductors are provided within the cylindrical extension portion of the device.

In FIG. 6, there is shown a cross sectional view along line VI—VI of FIG. 1 to illustrate how the conductors 30 and 32 leading from the planar thermocouple 88 pass between the ends of thermocouple 86 and the temperature signal conductors 34 and 36 leading from the split ring thermocouple 86 pass within the opening 84 to the terminal block.

Figure 7:
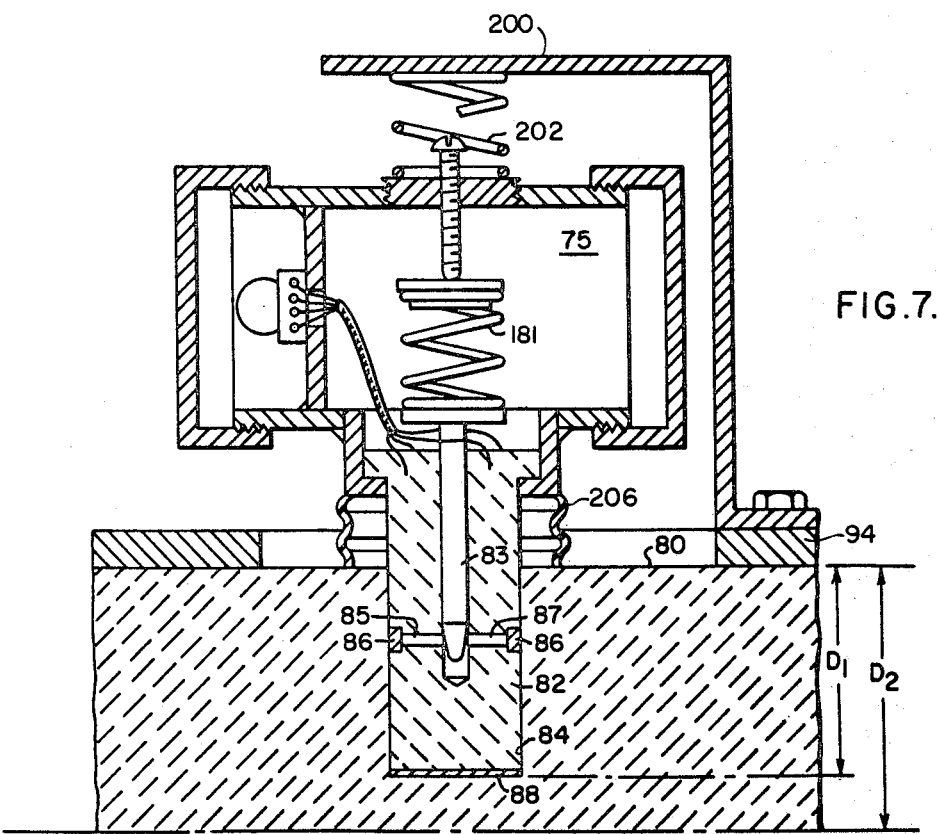
FIG. 7 is a schematic showing of another embodiment of the present invention.

In FIG. 7, there is shown a modified embodiment of the present invention, wherein a lower shaft is not included and a support arm 200 is fastened to the steel cladding 94 in cooperation with a spring 202 to press the entire heat flow measurement device 75 into the opening 84 such that the thermocouple 88 is firmly pressed against the bottom of the hole 84 in the wall 80 of the kiln. The asbestos boot 206 is provided to keep dirt and foreign matter out of opening 84.

The heat loss through the kiln wall is determined by means of the heat flow sensing thermocouple elements 86 and 88, with the heat flux at any given location being equal to K, the heat transfer coefficient of the whole assembly, times $\Delta T$, the temperature difference as sensed by the heat flow sensing device or devices at that location. The total heat flux $q_9$ lost through the kiln is set forth in the referenced copending application and is obtained by the formula $$q_9 = \pi D \cdot \frac{5h_1}{288}[94q_{25} + 50q_{24} + 50q_{23} + 75q_{22} + 19q_{21}]$$
$$+ \pi D \cdot \frac{2h_2}{45}[75q_{21} + 32q_{20} + 12q_{19} + 39q_{18}] \quad (15)$$

To determine the heat loss through the kiln walls at least one and preferably three thermocouple devices capable of each measuring the difference in temperature between two fixed points within the refractory furnace wall will be placed equidistantly around the periphery of the kiln at any given location, with perhaps eight such locations being chosen along the length of the kiln as generally shown in FIG. 3; with five locations 104 through 112 in the burning zone and three locations 114 through 118 in the drying and calcinating zones being shown. The EMF temperature signals from three such thermocouple devices will be picked up by means of slip rings as shown in FIG. 4 and brush contacts. This data is then used to calculate the heat flux through the kiln wall at each such location along the length of the kiln, with the flux at any location being $q_0$ which equals $K\Delta T$, where K is the known heat transfer coefficient of the whole assembly.

It should be understood that the herein described apparatus is merely illustrative of the present invention, and other embodiments can be readily made within the scope and spirit of this invention. For example, it is within the scope of the present invention to increase the distance $(D_2 - D_1)$ as desired in relation to the other illustrated distances to reduce the temperature sensed by the thermocouple 88 for a more severe practical application of the disclosed apparatus. Also, it is within the scope of the present invention to vary the radius of the shaft 81 in relation to the radius of plug member 83 as desired to better match the heat flow operation of the plug member structure in regard to that of the refractory wall 80.

We claim as our invention:

1. In heat flow sensing apparatus for use with a heat conducting device having an opening extending between a first surface and a second surface of said device, said device having a first heat flow characteristic, the combination of:

heat flow sensing means adapted for insertion into said opening and including an elongated member having a first portion and a second portion positioned within said opening, with said first portion having a first cross sectional area and a second heat flow characteristic and said second portion having a second cross sectional area and a third heat flow characeristic and each of said portions extending between said surfaces and being conductive to heat flow between said first surface and said second surface, with said first cross sectional area having a predetermined relationship to said second cross sectional area and the second and third heat flow characteristics having a predetermined relationship to the first heat flow characteristic, such that the resulting heat flow characteristic of said elongated member is substantially the same as said first heat flow characteristic of said heat conducting device, first temperature sensing means carried by said member and being operative to provide a first indication in accordance with the temperature of said first surface of said device, second temperature sensing means carried by said member a predetermined distance from said first means and being operative to provide a second indication in accordance with the temperature of said second surface of said device, said heat flow sensing means being operative to determine the heat flow through said device.

2. The heat flow sensing apparatus of claim 2, wherein: said first heat flow characteristic of said heat conducting device is less than said second heat flow characteristic and is greater than said third heat flow characteristic.

3. The heat flow sensing apparatus of claim 1, wherein: said first cross sectional area is smaller than said second cross sectional area and said second heat flow characteristic is greater than said third heat flow characteristic.

4. The heat flow sensing apparatus of claim 1, including:

said first portion including a positioning member extending substantially the length of said elongated member and having said second heat flow characteristic which is greater than said third heat flow characteristic.

References Cited
UNITED STATES PATENTS

| | | | |
|---|---|---|---|
| 2,839,594 | 6/1958 | Schneidersmann | 136—221 |
| 2,875,613 | 3/1959 | Neal | 73—341 |
| 2,951,360 | 9/1960 | Sampson et al. | 73—15 |
| 3,018,663 | 1/1962 | Dunlop | 73—340 |
| 3,372,587 | 3/1968 | Nanigian | 73—15 |

JAMES J. GILL, Primary Examiner

H. GOLDSTEIN, Assistant Examiner

U.S. Cl. X.R.

73—341